(12) United States Patent
Stutz, Jr. et al.

(10) Patent No.: US 8,936,416 B2
(45) Date of Patent: Jan. 20, 2015

(54) FLUIDIZED PARTICLE ABRASION DEVICE WITH PRECISION CONTROL

(71) Applicant: Crystal-Mark, Inc., A Swan Technologies Corporation, Glendale, CA (US)

(72) Inventors: William H. Stutz, Jr., Eagle Rock, CA (US); Jawn P. Swan, Los Angeles, CA (US); Keith D. Swan, Sylmar, CA (US); E. Michael Swan, Burbank, CA (US); John J. Quintus, Murrieta, CA (US)

(73) Assignee: Crystal-Mark, Inc., A Swan Technologies Corporation, Glendale, CA (US)

( * ) Notice: Subject to any disclaimer, the term of this patent is extended or adjusted under 35 U.S.C. 154(b) by 0 days.

(21) Appl. No.: 14/200,364

(22) Filed: Mar. 7, 2014

(65) Prior Publication Data

US 2014/0328636 A1 Nov. 6, 2014

Related U.S. Application Data

(60) Provisional application No. 61/839,491, filed on Jun. 26, 2013, provisional application No. 61/818,161, filed on May 1, 2013.

(51) Int. Cl.
*B65G 53/46* (2006.01)

(52) U.S. Cl.
USPC ............. 406/132; 406/75; 406/136; 406/137; 406/144; 406/146; 222/400.5

(58) Field of Classification Search
CPC .............................. B65G 53/22; B65D 90/626
USPC ........... 406/132–133, 75, 136, 137, 144, 146; 222/400.5
See application file for complete search history.

(56) References Cited

U.S. PATENT DOCUMENTS

| | | | | |
|---|---|---|---|---|
| 2,048,139 | A | * | 7/1936 | Porteous ....................... 406/102 |
| 2,170,258 | A | | 8/1939 | Borch |

(Continued)

FOREIGN PATENT DOCUMENTS

| | | |
|---|---|---|
| JP | 09253401 A | 9/1997 |
| JP | 2000280173 A | 10/2000 |
| JP | 2003230562 A | 8/2003 |

OTHER PUBLICATIONS

U.S. Appl. No. 14/156,959, filed Jan. 16, 2014, titled "Micro Particle Flow Facilitator".

(Continued)

*Primary Examiner* — Joseph Dillon, Jr.
(74) *Attorney, Agent, or Firm* — Leech Tishman Fuscaldo & Lampl LLP; Denton L. Anderson

(57) ABSTRACT

A portable air abrasion device has a dispensing chamber and a flow valve for controlling the flow rate from the dispensing chamber. The flow valve includes a fluid flow chamber for receiving granular materials exiting the dispensing chamber. The fluid flow chamber has a granular materials inlet port, a fluid flow inlet port for receiving the flow of a fluid to the fluid flow chamber and a fluidized granular material exit port for dispensing a fluidized mixture of the granular material away from the fluid flow chamber. The fluid flow chamber also has a flow regulator employing a lead screw to control the flow of fluidized granular material through the fluidized granular material exit port.

17 Claims, 10 Drawing Sheets

(56) References Cited

U.S. PATENT DOCUMENTS

| | | | |
|---|---|---|---|
| 2,192,287 A * | 3/1940 | Goebels | 406/138 |
| 2,696,049 A * | 12/1954 | Black | 433/88 |
| 2,734,782 A * | 2/1956 | Galle | 406/132 |
| 2,740,561 A | 4/1956 | Coffman, Jr. | |
| 2,878,969 A * | 3/1959 | Griswold | 406/132 |
| 3,337,094 A | 8/1967 | Houston | |
| 3,407,972 A * | 10/1968 | Cymbalisty | 222/196 |
| 3,432,208 A * | 3/1969 | Draper et al. | 406/93 |
| 3,525,445 A | 8/1970 | Barger | |
| 3,595,437 A | 7/1971 | Howard | |
| 4,176,767 A | 12/1979 | Franche | |
| 4,383,766 A | 5/1983 | Eriksson | |
| 4,416,568 A * | 11/1983 | Anderson | 406/123 |
| 4,472,091 A * | 9/1984 | Callahan | 406/132 |
| 4,502,819 A * | 3/1985 | Fujii et al. | 406/14 |
| 4,569,161 A * | 2/1986 | Shipman | 451/99 |
| 4,591,075 A | 5/1986 | Eriksson | |
| 4,733,503 A * | 3/1988 | Gallant et al. | 451/75 |
| 4,810,156 A | 3/1989 | Pendleton et al. | |
| 4,934,569 A | 6/1990 | Womack et al. | |
| 5,012,957 A | 5/1991 | Mihail | |
| 5,490,745 A * | 2/1996 | Thiele et al. | 406/132 |
| 6,079,911 A * | 6/2000 | Wangermann et al. | 406/132 |
| 6,083,001 A | 7/2000 | Deardon et al. | |
| 6,186,360 B1 | 2/2001 | Becker et al. | |
| 6,244,788 B1 * | 6/2001 | Hernandez | 406/144 |
| 6,283,680 B1 * | 9/2001 | Vidal | 406/128 |
| 6,708,851 B2 | 3/2004 | DaSilva | |
| 6,776,361 B1 | 8/2004 | Watanabe et al. | |
| 6,802,685 B1 * | 10/2004 | Federhen | 414/292 |
| 6,892,748 B2 * | 5/2005 | Junier et al. | 137/240 |
| 8,200,367 B2 | 6/2012 | Foley et al. | |
| 2002/0137005 A1 | 9/2002 | Cevey et al. | |
| 2003/0024955 A1 | 2/2003 | Maguire | |
| 2003/0131666 A1 | 7/2003 | Ewers et al. | |
| 2009/0001101 A1 | 1/2009 | Zahradka et al. | |
| 2011/0204094 A1 | 8/2011 | Meckstroth et al. | |
| 2012/0015592 A1 | 1/2012 | Eliason | |
| 2012/0181345 A1 | 7/2012 | Mueller | |

OTHER PUBLICATIONS

"Backlash (engineering)." Wikipedia. (publication date unknown) <http://en.wikipedia.org/w/index.php?title=Backlash_(engineering)&printable=yes>.

Office Action dated Jul. 31, 2014 issued in U.S. Appl. No. 14/156,959.

International Search Report and Written Opinion issued in PCT/US2014/035717 on Aug. 21, 2014.

International Search Report and Written Opinion issued on Sep. 1, 2014 in International Application No. PCT/US2014/035718.

* cited by examiner

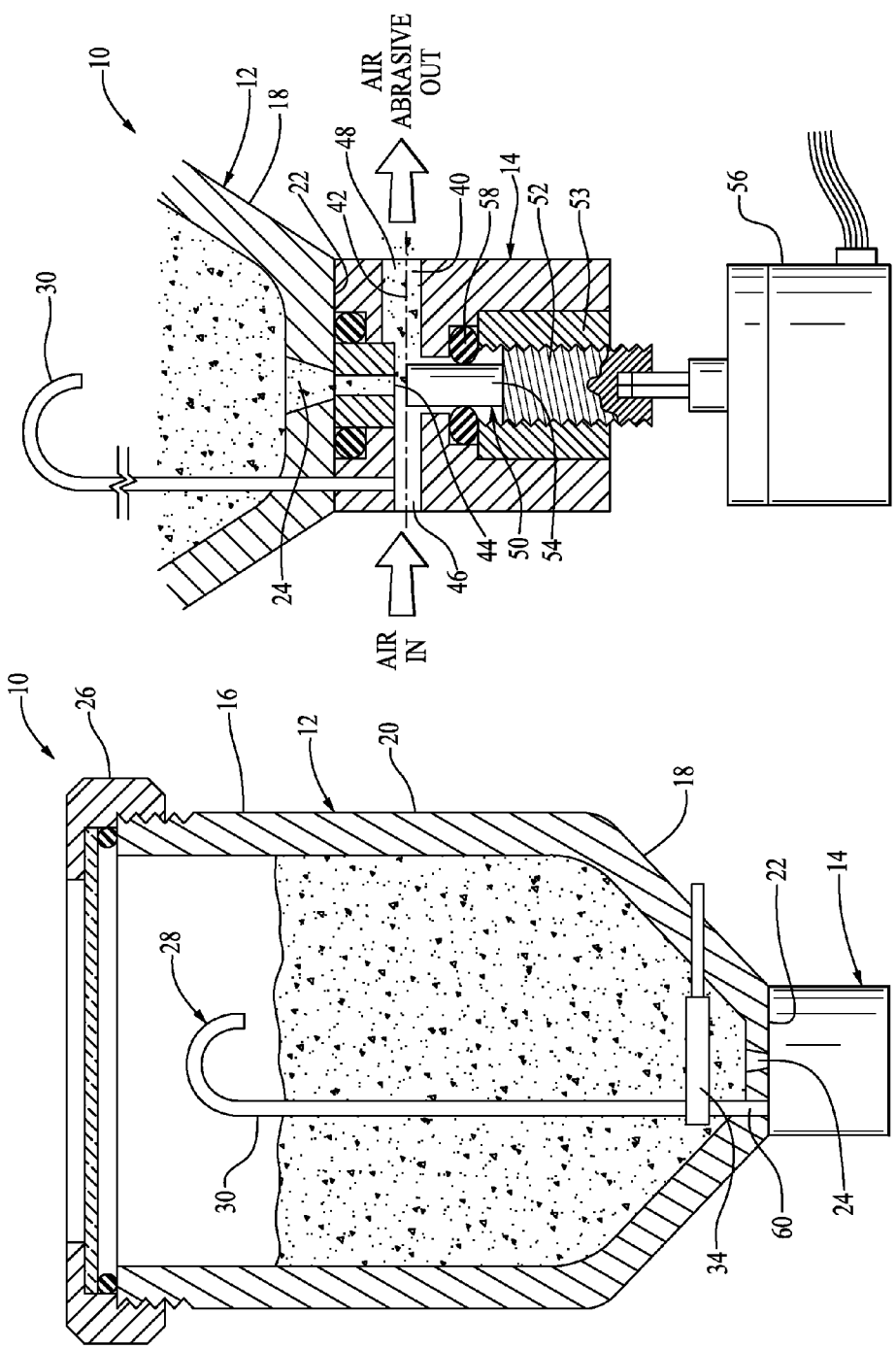

FLUIDIZED PARTICLE ABRASION DEVICE WITH PRECISION CONTROL

RELATED APPLICATION

This application claims priority from U.S. Patent Application Ser. No. 61/839,491, entitled "Portable Air Abrasion Device With Precision Control Means," filed Jun. 26, 2013 and U.S. Patent Application Serial No. 61/818,161, entitled "Flow Facilitator," filed May 1, 2013, the entirety of both of which is incorporated herein by reference.

FIELD OF THE INVENTION

This invention relates generally to fluidized particle abrasion devices.

BACKGROUND OF THE INVENTION

In its most primitive form "sandblasting" can be accomplished by simply gravity feeding an abrasive media such as sand from a hopper with a hole in the bottom into a pressurized air stream. A slightly more sophisticated version of this is to use a pressurized powder tank instead of a hopper. This combination of pressure and gravity allows for a more consistent flow of the media. A simple metering orifice at the nozzle tip also helps with consistent delivery. These crude forms of abrasive blasting may be adequate for removing rust from an old car body prior to repainting, but they leave much to be desired especially when macro and micro abrading tasks are the norm in today's high technology fields. So the industry's goal has been to develop more sophisticated devices that feature precision, repeatable and consistent control of a fine air abrasion stream. However, fine abrasive powders and surface conditioning media in the 10 to 100 micron range used in these systems do not like to flow easily or consistently! Getting them out of a storage chamber into an air stream in a precision, consistent volume has been problematic. There are numerous reasons for this. Due to their bulk density and or cohesive nature, fine particles like to agglomerate and can result in phenomena such as: caking, bridging or "rat holing" when the media is housed in a hopper or chamber. Prior Art has provided various solutions to these flow problems, some being more successful than others, but each having disadvantages as well.

Some early systems utilized pressurized vessels with incoming air forced through a nozzle internal to the tank with a tip configured to create an excitation or "sandstorm" of the abrasive particles within. This air/particle mix was then propelled out through a port to a nozzle tip. Flow rate for this approach is dependent on how much abrasive is in the hopper. Results are sporadic and lacks repeatability and are further complicated when finer particles, (below 50 micron) are required.

Another step forward in the quest for more consistent powder feed was a chamber configured like a funnel so that gravity would influence abrasive particles to feed through an orifice in the bottom of the chamber and out through a cross hole to the nozzle tip. A further improvement was the addition of a pulsing action on the input side of the pressure tank which encouraged the powder to flow out to the nozzle tip. This scheme offers a refinement but the powder flow is not independent of air pressure and not adjustable. Also as the powder hopper goes from full towards empty the flow rate varies. Furthermore, when changing over from one abrasive type to another, it may be necessary to change the internal orifice in the bottom of the powder chamber a task that can take several minutes.

A significant improvement was the vibratory powder feed system. The first of these consisted of a powder tank mounted on a vibrator. With an assist from gravity, powder was vibrated down through a multi hole orifice plate into a mixing chamber where incoming air would pick up the abrasive particles and deliver them through the exit port and out to the nozzle tip. Abrasive powder flow is adjusted by turning the amplitude of the vibrator via a rheostat. See Black, U.S. Pat. No. 2,696,049.

Although a big step forward in powder flow flexibility, repeatability and consistency the downside for cycles of a short duration (stop and go) is a puff of abrasive at the start of each cycle caused by a venturi like effect when a burst of powder has been sucked into the air stream. Also after the unit has been off for a time the first cycle presents a burst of powder, because due to gravity, abrasive has sifted down through the orifice plate.

A later vibratory feed system consisted of an upper hopper via gravity feeding a lower mixing chamber configured like a bowl feeder mounted on a vibrator coil mounted within an outer tank. The vibration of inner tank would induce the abrasive particles to spiral upward, on a track, where they would then escape though an exit orifice. See Gallant, Kulischenko, U.S. Pat. No. 4,733,503. While eliminating the gravity powder burst problem this design has an issue with abrasive cascading over the rim of the bowl feed chamber into the outer chamber and eventually damping down the vibrator coil within the outer pressure chamber. There is also an issue with the fact that in use the coil heats up and causes the flow rate to fluctuate. (This means the coil must be kept warm at all times). Furthermore the vibrator amplitude and hence the flow rate is not easily adjusted. This results in a very temperamental system.

Yet another type of system consisted of a funnel shaped pressurized hopper with powder vibrated by a ball and raceway mechanism, the ball orbiting around the perimeter of the exit orifice is propelled by pneumatic pressure. The ball bearing orbiting the orifice along with gravity induces the powder to flow out through an intersecting cross hole orifice in the bottom of the chamber. Up from the bottom of the orifice is a throttling needle like device, also described as a pintle. Pivoting upwards or downwards by moving a lever, the pintle creates an adjustable gap at the bottom of the chamber to allow for variable powder flow rates. See Shipman U.S. Pat. No. 4,569,161. While offering fairly consistent flow rates the downside of this approach is the fact that the pneumatic ball bearing race used to agitate the abrasive powder can tax a compressor as it uses considerable amount of air.

As described above each of these approaches work to a certain degree but each has its inherent weaknesses.

SUMMARY OF THE INVENTION

The invention overcomes these weaknesses. The invention is a portable fluidized particle abrasion device for dispensing powders and other granular material comprising: a) a granular material dispensing chamber having an upper portion, a lower portion, side walls and a bottom, the bottom defining an exit orifice; and b) a flow valve for controlling the rate of the granular materials exiting the dispensing chamber through the exit orifice. The flow valve comprises: i) an elongate fluid flow chamber for receiving granular materials exiting the dispensing chamber through the exit orifice, the fluid flow chamber having a longitudinal axis, a cross-sectional area, an inlet port in fluid tight communication with the exit orifice for allowing granular materials exiting the chamber through the exit orifice to enter the fluid flow chamber, a fluid flow inlet port for receiving the flow of a fluid to the fluid flow chamber and a fluidized granular material exit port for dispensing a fluidized granular mixture of the material away from the fluid flow chamber; and ii) a flow regulator comprising a lead screw disposed at an angle with respect to the longitudinal axis of the fluid flow chamber and threadably adjustable to alternatively open and close the exit orifice of the dispensing chamber and to alternatively expand and contract the distance between the lead screw and the exit orifice, so as to control the flow of fluidized granular material dispensed through the fluidized granular material exit port.

DRAWINGS

These and other features, aspects and advantages of the present invention will become better understood with reference to the following description, appended claims, and accompanying drawings where:

FIG. 1 is a cross-sectional view of an embodiment of a fluidized particle abrasion device having features of the invention;

FIG. 2 is a cross-sectional view illustrating a flow control usable in the embodiment illustrated in FIG. 1;

DETAILED DESCRIPTION OF THE INVENTION

Figure 3:
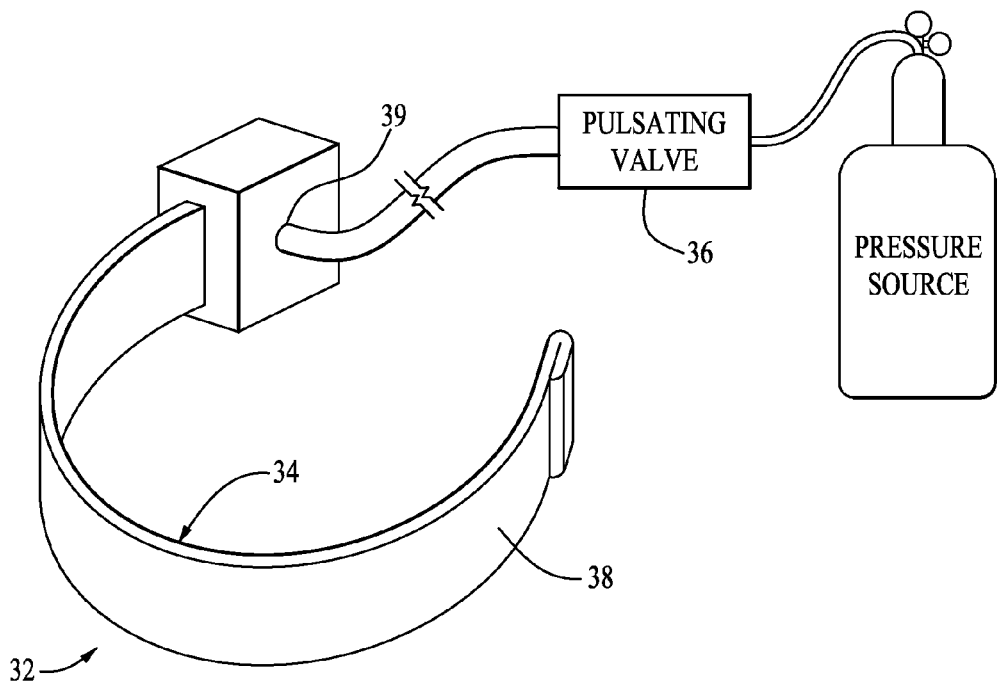
FIG. 3 is a perspective view of a flow facilitator usable in the invention.
Figure 4:
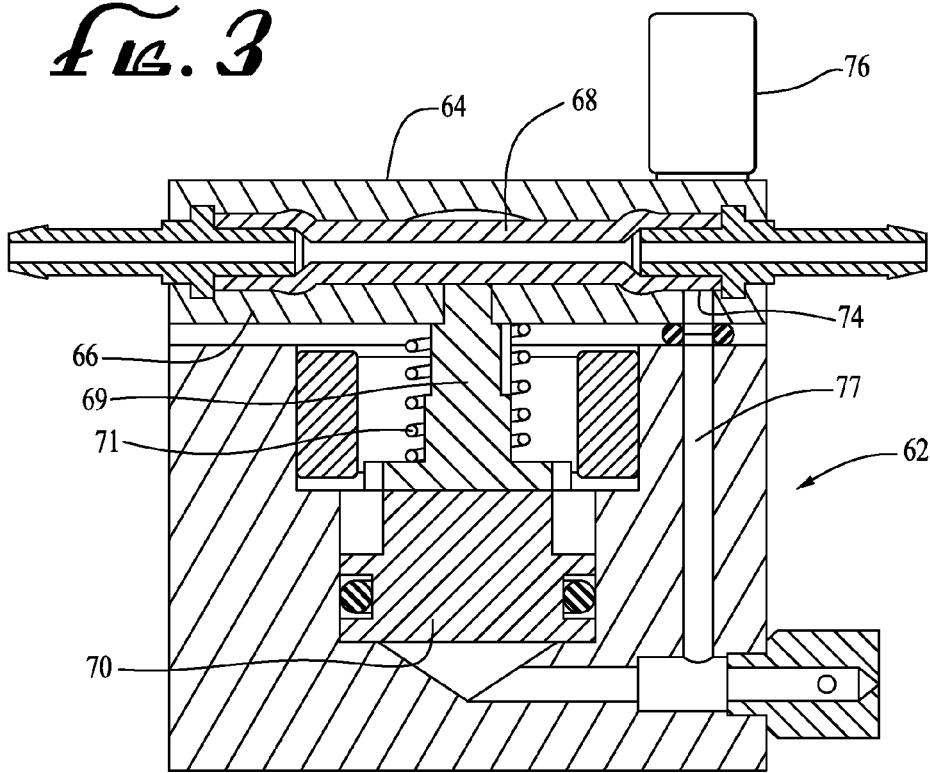
FIG. 4 is a cross-sectional view of a pinch valve usable in invention.
Figure 5:
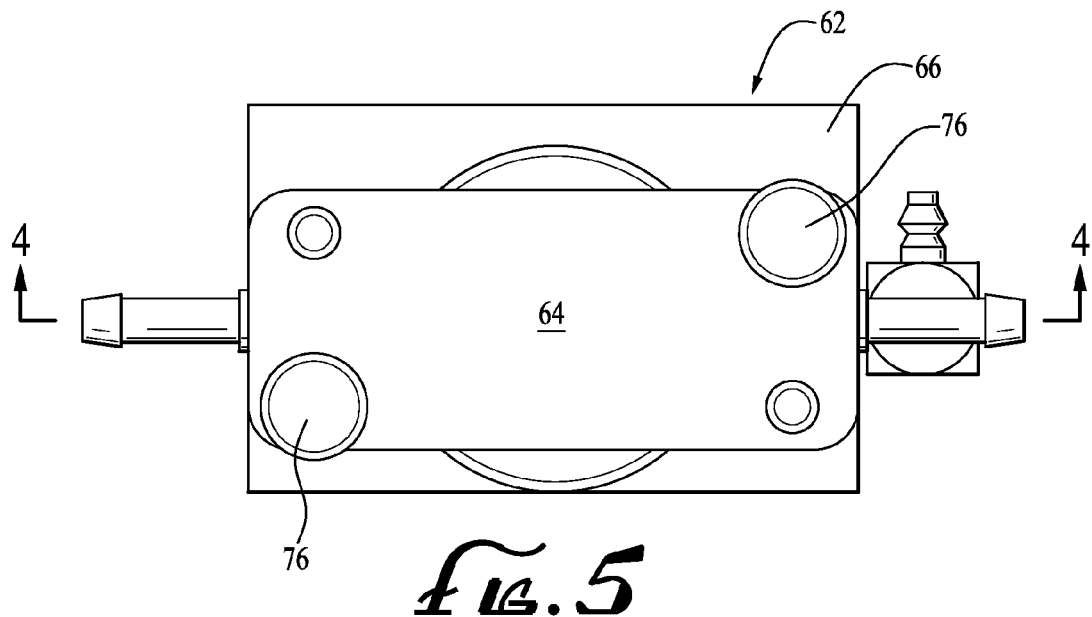
FIG. 5 is a top view of the pinch valve illustrated in FIG. 4.

The following discussion describes in detail one embodiment of the invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

The invention is a portable fluidized particle abrasion device 10 for dispensing powders and other granular material comprising a granular material dispensing chamber 12 and a flow valve 14. One embodiment of the invention is illustrated in FIGS. 1 and 2.

The granular material dispensing chamber 12 has an upper portion 16, a lower portion 18, side walls 20 and a bottom 22. The bottom 22 defines an exit orifice 24. Typically, the side walls 20 are cone-shape at the lower portion 18 of the dispensing chamber 12 to direct gravitation material within the dispensing chamber 12 toward the exit orifice 24.

It is also typical for the dispensing chamber 12 to be an internally pressurized vessel, having a removable pressure tight screw-on lid 26. In the embodiment illustrated in FIGS. 1 and 2, the dispensing chamber 12 is internally pressurized above the granular material level by a pressurizer 28 comprising a snorkel tube 30 in fluid tight communication with a source of pressurized gas. Pressurizing the dispensing chamber 12 assists in flowing granular material within the dispensing chamber 12 toward the exit orifice 24.

A flow facilitator 32 can be placed concentrically around the exit orifice 24 at the bottom 22 of the dispensing chamber 12 to agitate the downwardly gravitating granular material, so as to facilitate the smooth movement of granular material towards the exit orifice 24. One type of flow facilitator 32 is a bourdon tube flow facilitator described in U.S. Pat. App. Ser. No. 61/839,491, filed Jun. 26, 2013 and entitled "Portable Air Abrasion Device With Precision Control Means," the entirety of which is incorporated herein by reference. An embodiment of such flow facilitator 32 is illustrated in FIG. 3.

As can be seen in the embodiment illustrated in FIG. 3, the flow facilitator 32 comprises a bourdon tube 34 and a fluid pulsator 36. The bourdon tube 34 comprises a flexible, typically arcuate, duct 38 capable of expanding and contracting in response to pulsations of a pressurized fluid, typically a pressurized gas, such as pressurized air. The flexible duct 38 is hollow, closed-ended and has an inlet port 39.

The bourdon tube 34 is typically C-shaped and the flexible duct 38 is a flattened, curved tube. When pressure is applied to the interior of the flexible duct 38, the expansion of the duct 38 tends to straighten out the duct 38. Accordingly, pulsating pressure applied to the duct 38 causes the duct 38 to alternatively unfurl (straighten) and furl (curl back to its normal C-shape). Rapid pressure pulsations can cause the closed end of the duct 38 to vibrate. When the bourdon tube 34 is disposed within a granular material dispensing chamber 12, the alternating straightening and curling of the duct 38 continuously agitates granular material within the dispensing chamber 12, to thereby minimize material flow problems, such as caking, bridging and rat holing.

The flow valve 14 is adapted to control the rate of the granular material exiting the dispensing chamber 12 through the exit orifice 24. The flow valve 14 comprises an elongate fluid flow chamber 40 for receiving granular material exiting the dispensing chamber 12 through the exit orifice 24. The fluid flow chamber 40 has a longitudinal axis 42 and a cross-sectional area. The fluid flow chamber 40 also has (i) a granular material inlet port 44 in fluid tight communication with the exit orifice 24 for allowing granular material exiting the dispensing chamber 12 through the exit orifice 24 to enter the fluid flow chamber 40, (ii) a fluid flow inlet port 46 for receiving the flow of a carrier fluid to the fluid flow chamber 40 and (iii) a fluidized granular material exit port 48 for dispensing a fluidized granular mixture of the granular material out of the fluid flow chamber 40.

The flow valve 14 further comprises a flow regulator 50 comprising a lead screw 52 disposed at an angle, such as 90 degrees, with respect to the longitudinal axis 42 of the fluid flow chamber 40. The lead screw 52 is adjustable to alternatively open and close the exit orifice 24 of the dispensing chamber 12, and to alternatively expand and contract the distance between the lead screw 52 and the exit orifice 24, so as to control the flow of granular material dispensed through the fluidized granular material exit port 40.

As illustrated in FIG. 2, the granular material flow rate is preferably controlled by the movement of a blunt nosed carbide needle valve 54 called a "pintle" against or away from the exit orifice 24. This pintle 54 is affixed to the distal end of the lead screw 52. When the pintle 54 is moved away from its seated "home" position against the exit orifice 24, granular material is free to fall by gravity and by the positive pressure behind it into the fluid flow chamber 40. Moreover, as the pintle 54 is moved away from its home position against the exit orifice 24, the granular material is pulled down into the flow of carrier gas through the fluid flow chamber 40—analogous to a gas being throttled into a carburetor's venturi air stream.

In the embodiment illustrated in the drawings, the lead screw 52 rotates inside a stationary nut 53. A 0.000" gap ("the home position") allows no granular material to flow. A gap between the pintle 54 and the exit orifice 24 produces granular material flow into the fluid flow chamber 40. The narrow range of travel of the pintle 54 is very accurately controlled with a fine pitch (i.e., greater than 80 T.P.I., for example 110 T.P.I.) lead screw 52.

The lead screw 52 is preferably moved by use of a motorized driver 56. The use of a stepper motor as the motorized driver 56 is the preferred embodiment, such as with a 5:1 ratio gearhead. Alternate embodiments include the use of a servo motor or other multi-turn rotational means to drive the lead screw 52.

By motor driven lead screw/pintle assembly to its home position, an almost instantaneous shut off of the granular material flow can be achieved, thus allowing only the carrier gas to flow. This temporary, no-abrading, carrier gas only feature is very useful for many procedures. Reversing the motor direction causes the screw/pintle assembly to retract from its home position and allows abrading to resume. These two functions are operator controlled by a two-position foot switch 80.

As can also be seen in FIG. 2, various O-rings 58 can be used to seal and prevent air leakage. Additionally, there can be a pressure equalization channel 60 providing carrier fluid into the dispensing chamber 12. In the dispensing chamber, this stream of carrier fluid travels through the snorkel tube 30 to a point above the maximum granular material level.

The granular material exit port 48 is typically coaxial with the fluid flow inlet port 46 in the flow valve 14. Also, its inside diameter is typically about 200%-250% larger than the inlet port—which provides the venturi effect—acting as a final encouragement for powder to flow into the air stream. In a typical embodiment, the fluid flow inlet port 46 is 0.040" in diameter and the fluidized granular material exit port 48 is 0.060 in diameter.

In one embodiment of the invention, a pinch valve 62 is disposed downstream of the flow valve 14 and adapted to block the flow of fluidized granular mixture away from the fluid flow chamber 40. As illustrated in FIGS. 4 and 5, the pinch valve 62 preferably comprises: i) a top portion 64, and a bottom portion 66, the top portion 64 being removably attached to the bottom portion 66; and ii) a flexible pinch valve tube 68 disposed in fluid tight communication with the fluidized granular material exit port 48. The pinch valve tube 68 is sandwiched between the top portion 64 and bottom portion 66.

The pinch valve tube 68 is "pinched" by a plunger 69 in communion with a piston 70 pressurized by a pneumatic solenoid 72. The pinch valve tube 68 is "opened" by a spring 71 acting against the lower portion 66 and the plunger 69 when the pneumatic solenoid 72 is de-energized.

The pinch valve tube 68 defines a vent hole 74 which is squeezed closed when the top portion 64 is attached to the bottom portion 66, but which is open when the top portion 64 is removed from the bottom portion 66.

In the embodiment illustrated in the drawing, the pinch valve tube 68 is held captive by the upper portion 64 and the lower portion 66. Two thumb screws 76 hold the top potion 64 tightly against the lower portion 66.

The pinch valve tube 68 is made from an elastomeric, abrasion resistant material and is held in compression around the hose fittings on each end by the clamping pressure of the blocks. The vent hole 74 is located underneath one of the compression areas. Because of compression provided by the interaction of the top portion 64 and the bottom portion 66, the rubber like material of the pinch valve tube 68 seals the vent hole 74. Removing the block thumb screws 76 breaks the seal and vents fluid from the system through a vent conduit 77. After pressure within the pinch valve tube 68 is vented via the vent hole 74, the pinch valve tube 68 can be quickly removed from the pinch valve 62 and replaced with a new pinch valve tube 68. Replacing the upper portion 64 tightly against the lower portion 66 and tightening the two thumb screws 76 completes the exchange and re-seals the depressurizing vent hole 74 in the new pinch valve tube 68.

The invention provides an improved portable air abrasion device when can be conveniently employed for surface conditioning of various substrates. The invention is useful for many applications including deburring, deflashing, cleaning, etching, coating removal, surface conditioning, fossil preparation, artistic carving and cutting or abrading of hard and/or delicate brittle materials.

FIGS. 6-14 illustrate an embodiment of the fluidized particle abrasion device 10 of the invention adapted for employment as a dentistry tool. This embodiment of the fluidized particle abrasion device 10 is compact, battery powered and fully portable. It has precision adjustable controls for both carrier fluid pressure and granular material flow rate, and includes ergonomic and graphic controls. It also has illuminated control settings, an audible abrading signal and a remote wireless control foot switch 80. Still further, it comprises a blast hose storage with magnetic hand piece holder, an air/helium propellant option, a visual powder level, an automatic depressurization system and a disposable hand piece/hose assembly. The embodiment is of a modular construction for ease of manufacture and service.

As illustrated in FIGS. 6 and 7, this embodiment includes

An external pressurized air propellant source.

A compact housing 81 containing all components.

A dispensing chamber 12 for retaining and dispensing various media

A pneumatically pulsed bourdon tube powder flow facilitator 32 inside of the dispensing chamber 12

Precision control means for adjusting the flow of powdered media into an airstream Precision control means for adjusting said airstream pressure.

An ergonomic, illuminated, graphic operator control means for making adjustments and checking system status.

Additional operator control means in the form of a remote wireless foot switch 80 to control Stop/Start, Abrade or Air Only functions.

Electronic means to support all of the above.

Pneumatic means to support all of the above.

An abrade delivery hose with hand piece 82 having provision for nozzle tips of various configurations and inside diameters.

A pinch valve 62 shutoff means to stop air abrasion flow.

This embodiment of the invention 10 can be effectively employed in a wide range of dentistry procedures, including preparations for sealants and decay on occlusal surfaces of teeth, removing inter proximal decay from between teeth, preparing for veneers, inlays, on-lays and crowns, prepping teeth along receding gingival margins to add composite to those areas with exposed dentin, removing failed composites an sealants, remove temporary cement before the permanent prosthesis is cemented in, removing the black stain down inside a cavity when the amalgam is removed, disclosing access points during an endodontic procedure, air abrading many ceramic and hybrid prosthetic materials before cementing them into the mouth.

Figure 6:
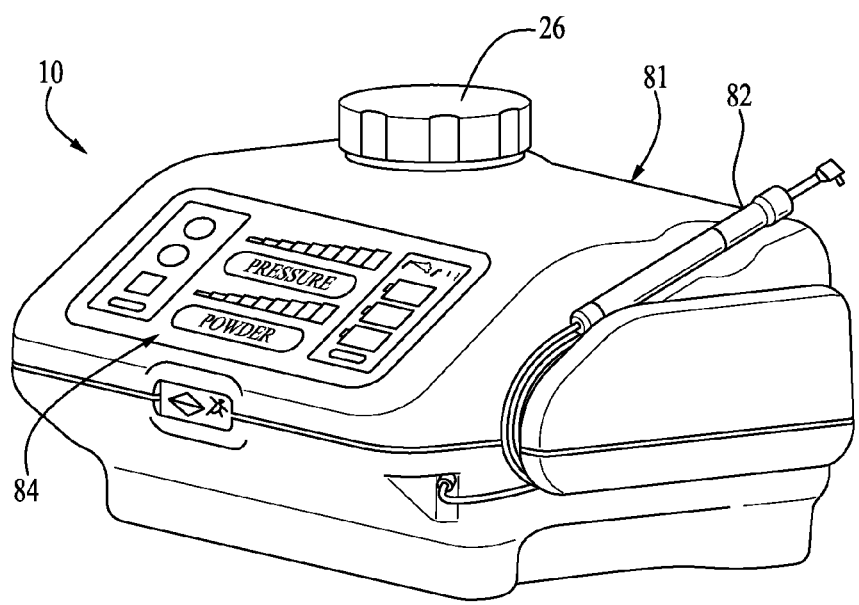
FIG. 6 is a perspective view of a fluidized particle abrasion device having features of the invention.
Figure 7:
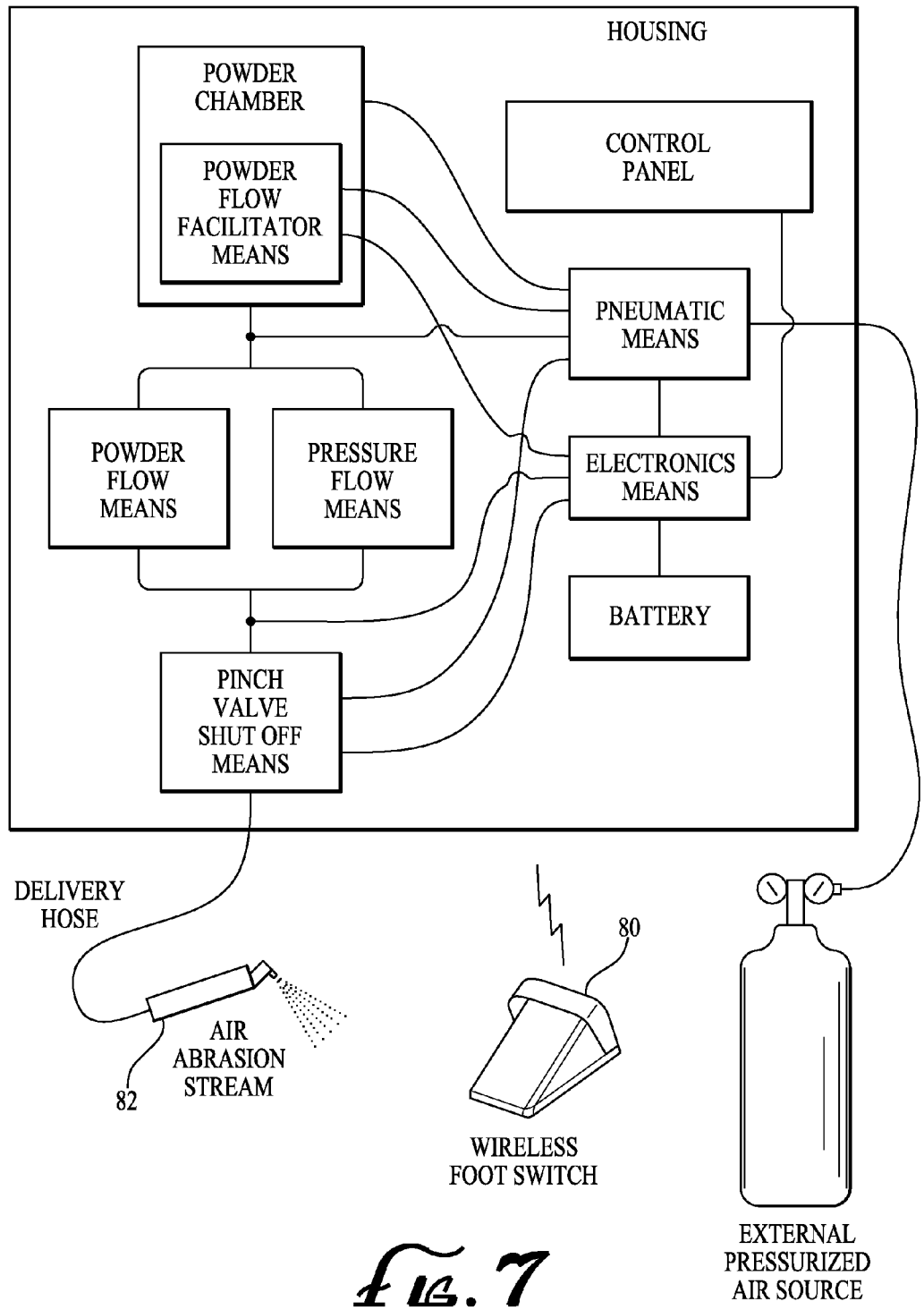
FIG. 7 is a first block diagram illustrating components of the embodiment illustrated in FIG. 6.

FIG. 6 shows the complete unit as enclosed in its housing. Typical dimensions of the housing are: 10.5" in length, 8.0" in width, 5.0" in height and 8 lbs. in weight.

Figure 8:
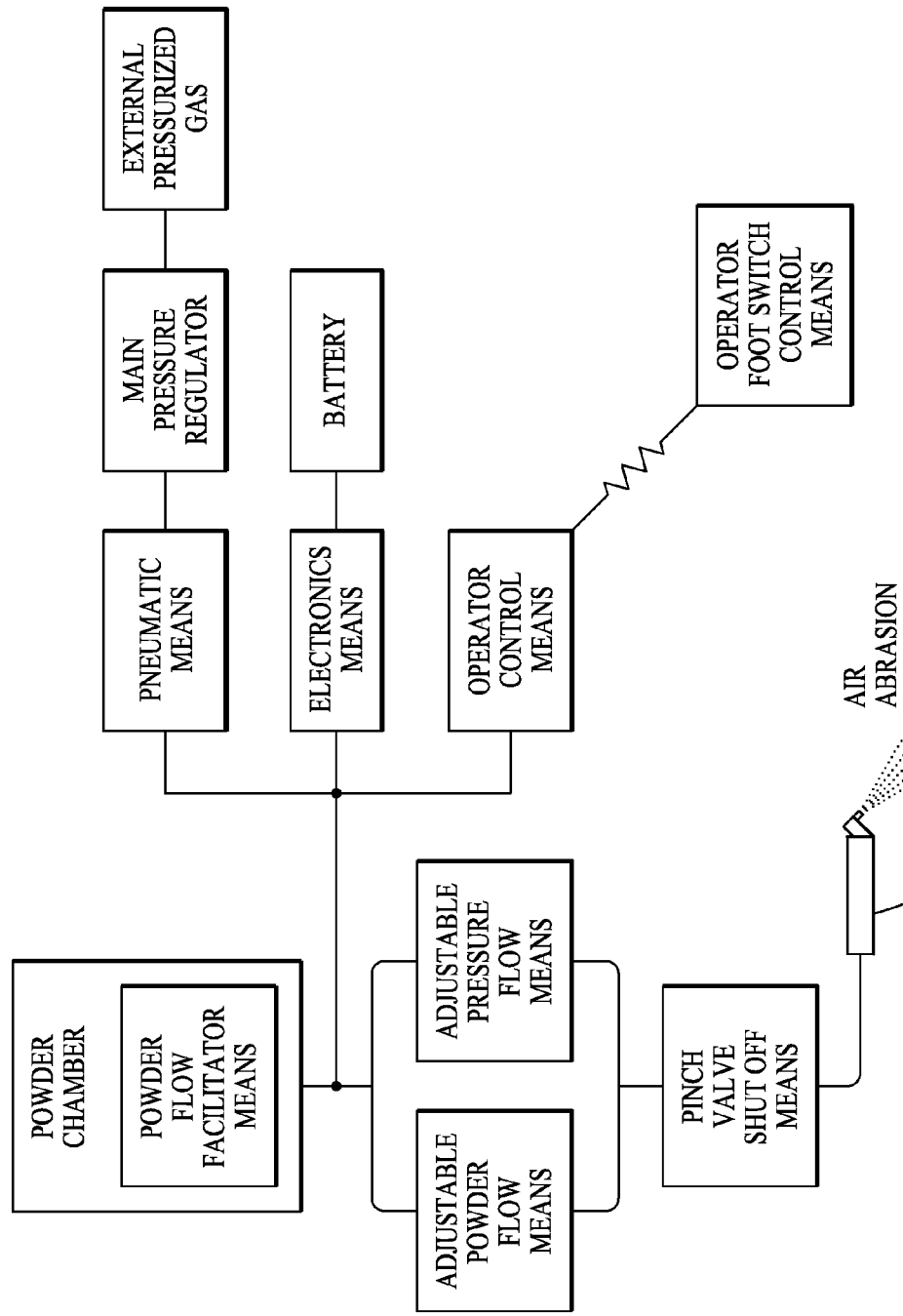
FIG. 8 is a second block diagram illustrating components of the embodiment illustrated in FIG. 6.

FIG. 8 shows a block diagram of the major components and how they relate to one another. Shown are:

1. A pressurized dispensing chamber 12 with a transparent lid 26 for storing and dispensing abrasive or surface conditioning media.

2. A flow facilitator 32 inside the dispensing chamber 12 in the form of a bourdon tube 34 driven by an electronically controlled pulsator.

3. A flow valve 14 that mates with the underside of the dispensing chamber 12. Flow rate of granular material is controlled electro-mechanically by control functions referenced on the membrane control panel.

4. Adjustable carrier gas regulation means whose pressure is electro-mechanically controlled by the pressure control function on a membrane panel 84.

5. A pressure regulator 78 to reduce the incoming carrier gas pressure to the level desired in the system.

6. An external pressurized carrier gas source. The system can utilize either compressed air or helium for abrading, but air is needed for the general pneumatic system of the device.

7. Operator control means in the form of the membrane switch panel 84 which has the following functions:

Controls and Status Indicators For:
Power on/off
Air/Helium switching
Pressure adjustment
Powder flow adjustment
Status Indicators For:
Device battery
Foot switch battery
Plugged in and charging
Abrasive blast on
Air stream only on
All of the above functions feature LED backlit illumination 8. A foot switch 80 which is a stand-alone additional operator control. It is wireless. It has two switching functions. The first foot push enables air only to flow. A further foot push activates the second switch which makes the air abrasion stream active.

9. Electronics support means in the form of a printed circuit board module. It handles all of the electrical requirements of the system.

10. Pneumatic means consisting of numerous electro/pneumatic switching valves, check valves and pneumatic circuits needed to support the system functions.

11. A battery consisting of two 6 volt rechargeable nickel metal hydride (NiMH) battery packs wired in series to produce the 12V DC system voltage.

12. A pinch valve 62 which is a pneumatic/mechanical module that "pinches off" the air of the air abrasive stream flowing through a pinch valve tube 68. The pinch tube valve 68 comprises a short section of elastomeric abrasion resistant tubing that is in line with the air abrasive stream. It is "opened" when pneumatic solenoid 2 is energized venting to atmosphere. It is "pinched" closed when the pneumatic solenoid 72 is de-energized. The pinch valve tube 68 requires periodic replacement and is therefore placed externally on the rear of the device for easy access.

Figure 9:
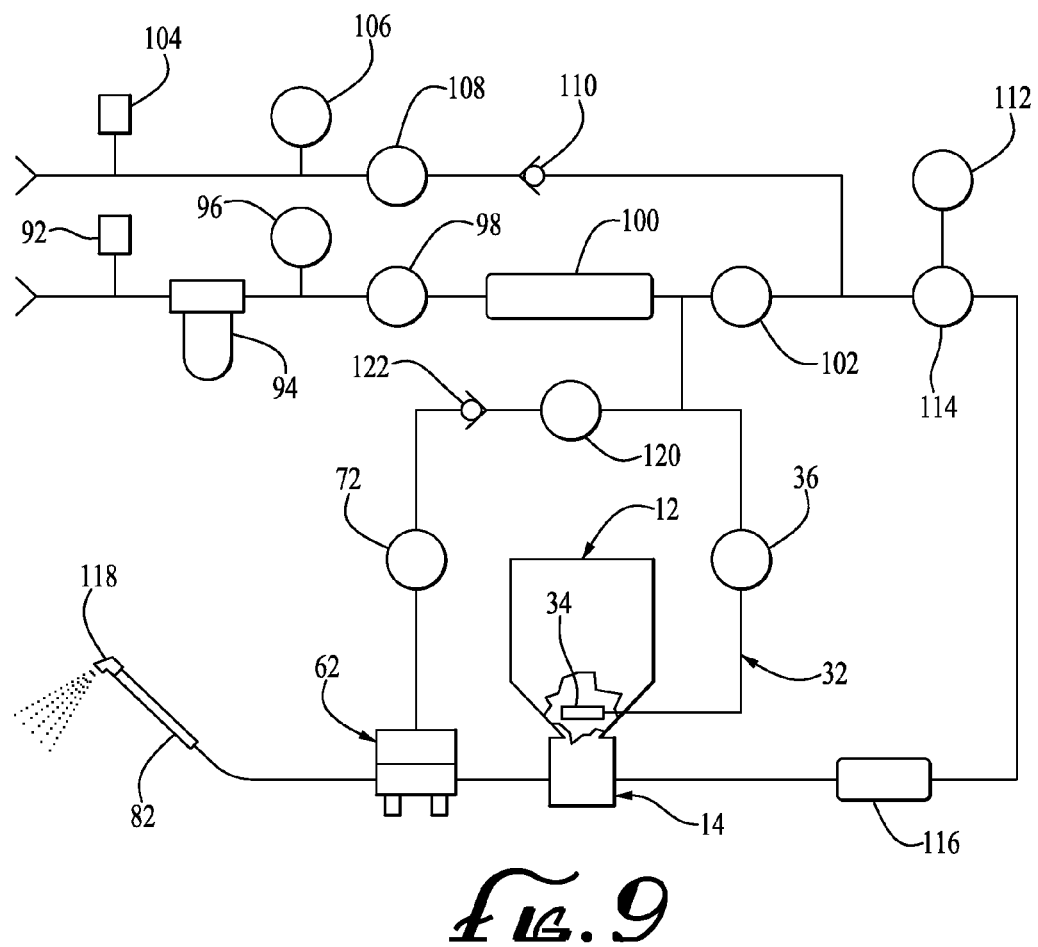
FIG. 9 is a block diagram illustrating pneumatic components of the embodiment illustrated in FIG. 6.

FIG. 9 is a block diagram illustrating the pneumatic components of this example embodiment. Shown in FIG. 9 is the dispensing chamber 12 having the bourdon tube 34 of a flow facilitator 32 disposed therein and the flow valve 14. Carrier fluid can be provided by either a source of compressed air or a source of helium. From the source of compressed air, compressed air flows past an air safety valve 92, an air filter 94, an air sensor 96, a main air valve 98, a membrane filter 100 and an air solenoid valve 102. From the source of compressed helium, helium flows past a helium safety valve 104, a helium sensor 106, a helium solenoid valve 108 and a helium check valve 110. In all cases, the carrier fluid flows past a regulated pressure sensor 112, a pressure regulator 114 and a check filter 116. The bourdon tube 34 of the flow facilitator 32 is driven by the pulsator 36 using compressed air pressure. Downstream of the flow valve 14, the carrier fluid flows through the pinch valve 62 to the hand piece 82 having a nozzle 118. The pinch valve 62 is driven by a pneumatic solenoid 72 using compressed air which flows through a pinch valve regulator 120 and pinch valve check valve 122.

Figure 10:
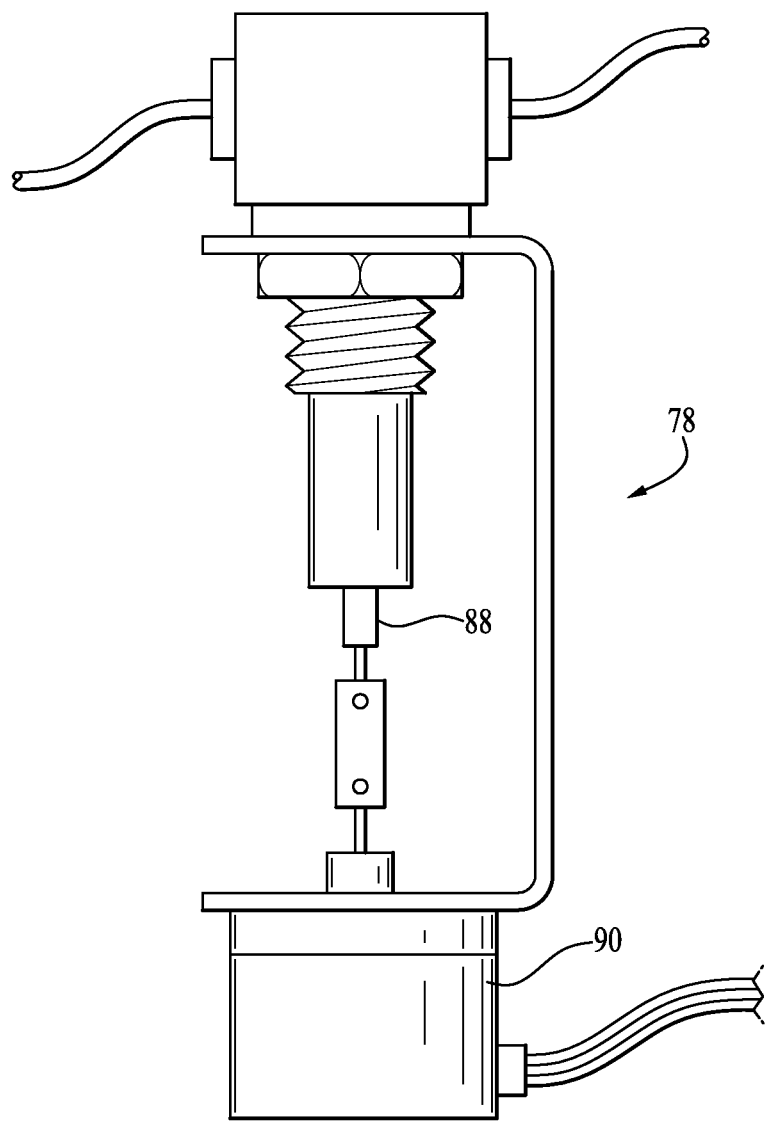
FIG. 10 is a side view of a pressure regulator usable in the invention.

FIG. 10 illustrates a pressure regulation system useable in the invention. Such pressure regulation system is a modular assembly comprising an adjustable pressure regulator 78 with a multi-turn control shaft 88 for adjustment. A gear head stepper motor 90 is employed to drive the control shaft 88. In the embodiment illustrated in FIG. 10, the control shaft 88 and the stepper motor 90 are mounted axially and in opposition to one another on a bracket and connected by a rigid shaft coupling.

Figure 11:
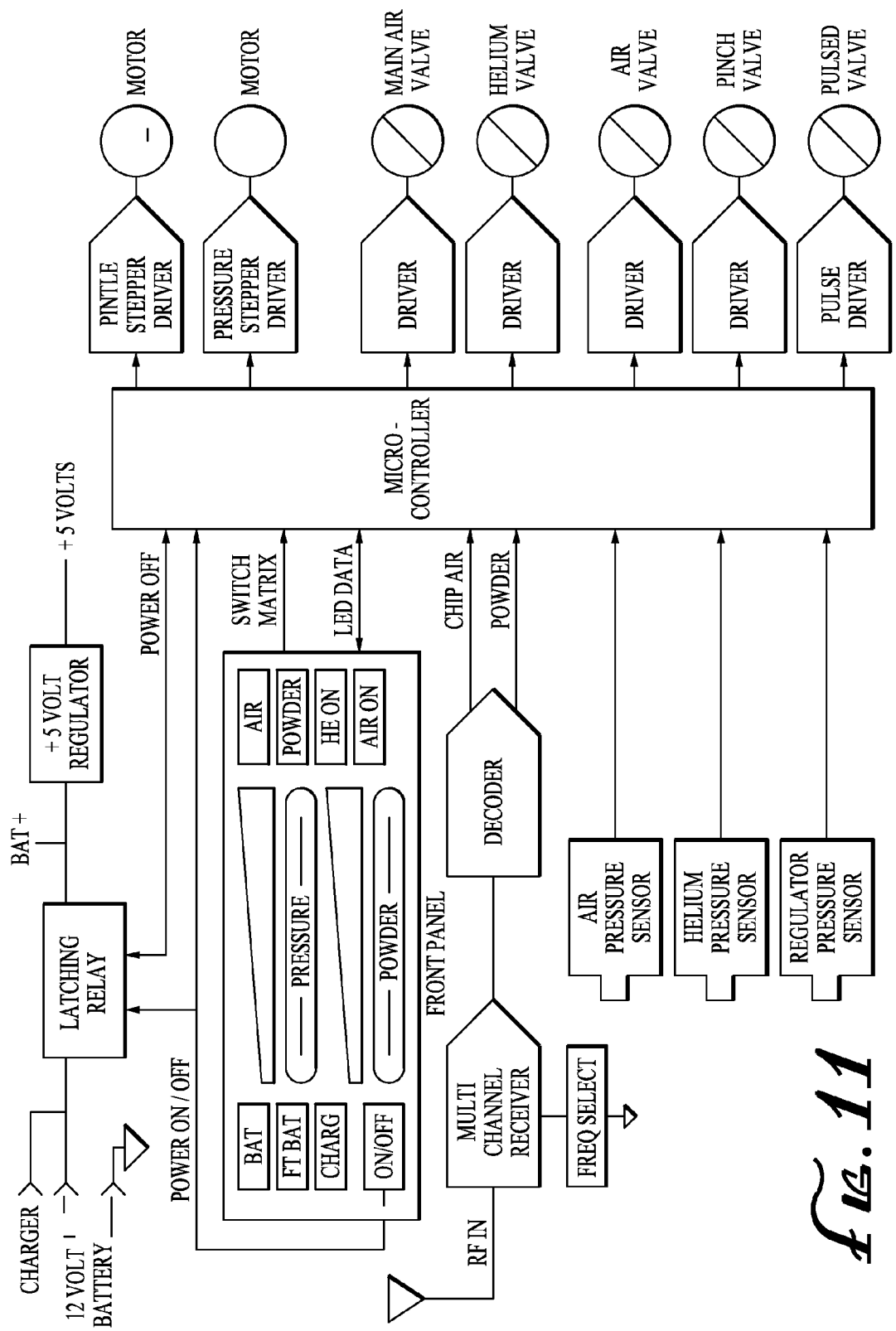
FIG. 11 is a block diagram illustrating electronic components of the embodiment illustrated in FIG. 6.
Figure 12:
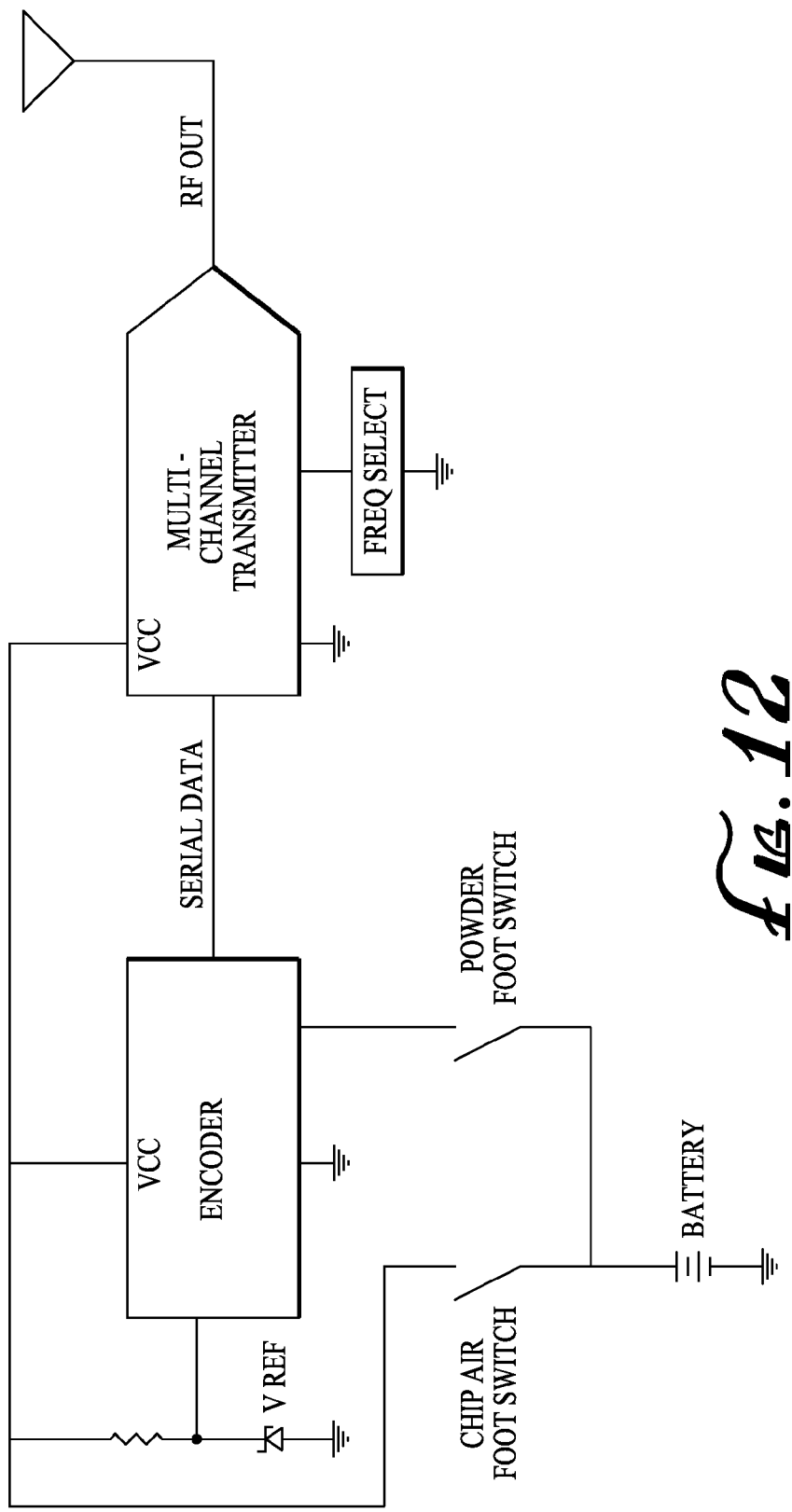
FIG. 12 is a block diagram illustrating electronic components of a foot switch usable in the invention.

FIG. 11 is a block diagram illustrating the electronic components of this example embodiment. FIG. 12 is a block diagram illustrating the electronic components of the foot switch 80.

Figure 13:
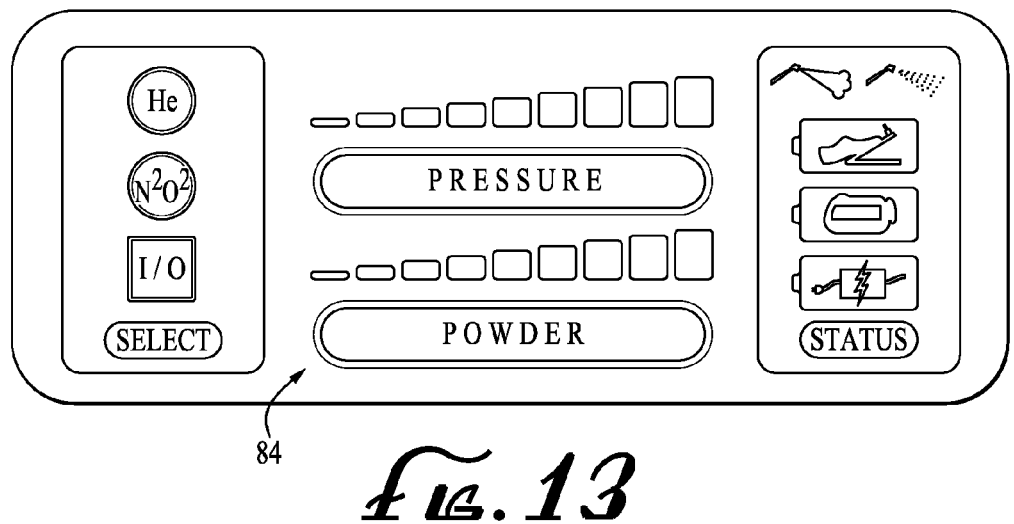
FIG. 13 is a detailed view of a control panel usable in the invention.

The membrane switch panel 84 can be a module of multilayer construction consisting of various membrane sheets, tactile and non-tactile switches, LED lights and a ribbon cable. As illustrated in FIG. 13, its switchable controls and status indicator functions are as follows:

Control and Status
Power on/off
Air/Helium switching
Propellant pressure adjustment
Powder flow adjustment
Status Only
Device battery
Foot switch battery
Plugged in and charging
Abrasive blast on
Air stream only on
All of the above functions are illuminated by LED backlighting.

The controls on the switch panel 86 are preferably ergonomic and graphic. They may consist of finger width, horizontal membrane pads with multiple pressure sensitive "wipe" switches underneath. Each has a peripheral raised bezel. Each array consists of nine non-tactile (no click response) switches. As one "swipes" one's finger across the pad from left to right, the switches sequentially tell the electronics to increase the propellant pressure or powder flow. Reversing the wipe direction will correspondingly reduce same. Wherever one stops the finger wipe is where the control will be set. Above each wipe pad is an array of LED lights arranged in vertical bar graph form to visually indicate the present control setting. Any switches that are wiped will have their corresponding bar graph lights remain lit. Alternatively, instead of a wiping action, a single finger "poke" anywhere in the membrane pad will result in setting the control at that point as well as lighting all the corresponding lower LED lights.

As shown in FIG. 6, a storage reel is provided for the dispensing hose and a concealed magnetic latch is used to hold the hand piece 82 in place.

Figure 14:
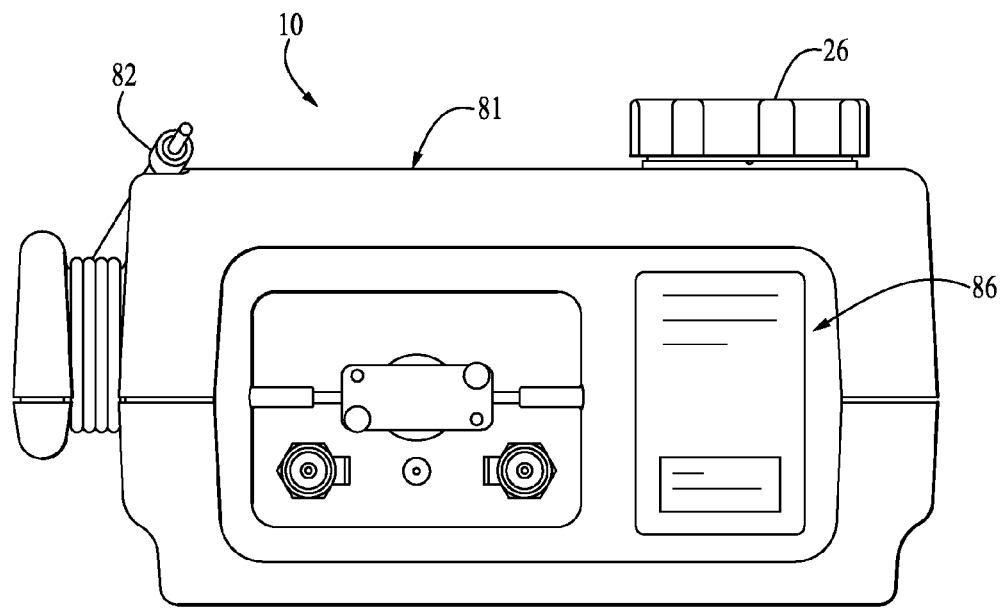
FIG. 14 is rear view of the embodiment illustrated in FIG. 6.

FIG. 14 shows the rear panel 86 of the housing 81. It has provisions for:
Air input
Helium input
12V D.C. input (battery charger)
Pinch valve 62 maintenance
Product/S.N. label
Within the system are various minor components such as:
A coalescing air filter
A particulate filter
A membrane air dryer
A fixed carrier fluid pressure regulator
Pneumatic check valves
Electro/Pneumatic switching valves
Pneumatic pressure relief valves
A pneumatic manifold
Pneumatic hoses and fittings
A sheet metal chassis
Electrical connectors As best seen in FIG. 3, the housing 81 comprises the switch panel 86, the dispensing chamber 12, the hand piece 82 with a replaceable nozzle, an air abrasive delivery hose and a storage reel.

To use this embodiment of the device 10, one must first charge the internal battery packs by connecting a charger to the rear 12V D.C. in connector. With a charged battery, the external carrier gas source (either air or helium) can be connected. If helium is to be the carrier gas of choice, a pressurized air source must also be connected as this is what the pneumatic functions of the device operate on.

The foot switch 80 with fresh batteries is placed on the floor in a convenient location. Pressing the power switch on the switch panel 84 and then selecting the carrier fluid of choice readies the device 10 for use.

Next, the settings for carrier fluid pressure and granular material flow need to be set. This is accomplished by "wiping" one's finger horizontally across the switch panel 84 portion marked "Pressure" and "Powder". Bar graph LED lights will sequentially light to indicate the degree of pressure or flow you have selected.

Having independent easy operator control of these two functions is an important and unique aspect of this device. Because of different media sizes and types and different nozzle inside diameters to select from, optimum abrading or surface conditioning of various substrates can be easily obtained. Clogging of nozzles can also be eliminated by reducing the amount of powder flowing into a given air stream pressure.

Pressing one's foot down partway on the foot switch 80 will activate a carrier gas only stream to flow out of the nozzle. This can be used for "blowing off", cleaning or drying of surfaces. Further depressing of the foot switch 80 activates the fluidized granular material stream to whatever setting has been selected on the main device control panel.

Compressed air, either from a compressor or a pressurized cylinder is the carrier gas for most typical sand blast systems. Other gases may also be used in specific applications.

Helium, for example, though not as readily available, has some very interesting characteristics that make it a strong candidate for the abrasive particle carrier gas. This is particularly true for intraoral dental procedures on teeth. While compressed air at 80 psi is very commonly used to ablate enamel and sometimes dentin, helium will cut 40% faster than air at any given pressure setting. And it does so with no increase in patient sensitivity. Sometimes even less sensitivity is seen. This phenomenon is likely due to the fact that the helium atom is one seventh the size of the air molecule and simply stated is therefore a better leaker than air and propels the particles more efficiently. Helium atoms also accelerate as they exit an orifice and try to get away from each other as fast as possible. In turn, this means the abrasive particles have no encumbrances to retard their acceleration. Helium also has the characteristic of warming slightly when exiting through an orifice from a pressure vessel which may also account for a reduction in patient sensitivity.

When patient sensitivity becomes an issue when ablating in dentin, it is a well-known technique for many clinicians familiar with the art, to reduce air pressure down to say 40 psi, for example, this can reduce patient sensitivity. The disadvantage with air however is that it also dramatically increases the time required to do a preparation. In contrast reducing pressure to 40 psi when using Helium means dentin is ablating away at a pace equivalent to air at about 80 psi. The result is faster prep time for the clinician. Furthermore reducing pressure down to 20 psi, to elicit even less patient discomfort, while impractical with air, is very doable with helium.

The primary reason helium has not been used in most of the other previously discussed air abrasion powder feed schemes, is that too much powder is introduced into the air stream making an already messy powder feed system even messier and harder to control.

The invention with its precise adjustable powder feed control will make using helium a very practical choice for the clinician. Furthermore, when the clinician deems that helium is not required, a push of a button will switch the system over to compressed air.

It should also be noted that even when helium is the propellant gas of choice the ancillary pneumatic functions of our device are being operated with compressed air so as to better conserve the supply of Helium.

In summary, while air is certainly more readily available, the unique characteristics of speed combined with the reduction in patient discomfort make helium a very strong candidate for intraoral dental procedures.

Having thus described the invention, it should be apparent that numerous structural modifications and adaptations may be resorted to without departing from the scope and fair meaning of the instant invention as set forth herein above and described herein below by the claims.

What is claimed is:

1. A portable fluidized particle abrasion device for dispensing powders and other granular material comprising:
   a) a granular material dispensing chamber having an upper portion, a lower portion, side walls and a bottom, the bottom defining an exit orifice;
   b) a flow valve for controlling the rate of the granular materials exiting the dispensing chamber through the exit orifice, the flow valve comprising:
      i) an elongate fluid flow chamber for receiving granular materials exiting the dispensing chamber through the exit orifice, the fluid flow chamber having a longitudinal axis, a cross-sectional area, an inlet port in fluid tight communication with the exit orifice for allowing granular materials exiting the chamber through the exit orifice to enter the fluid flow chamber, a fluid flow inlet port for receiving the flow of a carrier fluid to the fluid flow chamber and a fluidized granular material exit port for dispensing a fluidized granular mixture of the material away from the fluid low chamber; and
      ii) a flow regulator comprising a lead screw disposed at an angle with respect to the longitudinal axis of the fluid flow chamber and adjustable to alternatively open and close the exit orifice of the dispensing chamber and to alternatively expand and contract distance between the lead screw and the exit orifice, so as to control the flow of fluidized granular material dispensed through the fluidized granular material exit port; and
   c) a C-shaped flow facilitator tube having a flexible duct capable of furling and unfurling in response to pulsations of a pressurized fluid, the duct being hollow, closed-ended and having an inlet port, the flow facilitator being disposed within the dispensing chamber and around the exit orifice and a flow facilitator pressurizer to alternatively increase and decrease the pressure within the tube.

2. The portable fluidized particle abrasion device of claim 1 wherein the lead screw is driven by a motor.

3. The portable fluidized particle abrasion device of claim 1 wherein the lead screw is driven by a stepper motor.

4. The portable fluidized particle abrasion device of claim 1 wherein the lead screw is movable by a distance of less than 0.012 inches.

5. The portable fluidized particle abrasion device of claim 1 wherein the lead screw rotates within a stationary nut having greater than 80 T.P.I.

6. The portable fluidized particle abrasion device of claim 1 wherein a pintle is affixed to the tip of the lead screw and wherein the lead screw is movable between (i) a dispensing chamber closed position wherein the pintle seals the exit orifice closed and (ii) an open position wherein the pintle is disposed spaced apart from the exit orifice.

7. The portable fluidized particle abrasion device of claim 6 wherein the lead screw is disposed at an angle of about 90 degrees with respect to the longitudinal axis of the fluid flow chamber.

8. The portable fluidized particle abrasion device of claim 1 wherein the exit port of the fluid flow chamber has a cross-sectional area which is larger than the cross-sectional area of the inlet port.

9. The portable fluidized particle abrasion device of claim 1 wherein the exit port of the fluid flow chamber has a cross-sectional area which is 200%-250% larger than the cross-sectional area of the inlet port.

10. The portable fluidized particle abrasion device of claim 1 wherein the dispensing chamber is fluid tight and comprises a pressurizer.

11. The portable fluidized particle abrasion device of claim 10 further comprising a pressure regulator having a motor driven lead screw.

12. The portable fluidized particle abrasion device of claim 1 wherein the dispensing chamber comprises a removable lid.

13. The portable fluidized particle abrasion device of claim 1 further comprising a pinch valve disposed downstream of the flow valve and adapted to block the flow of fluidized granular mixture away from the fluid flow chamber, the pinch valve comprising:
   a) a top portion, and a bottom portion, the top portion being removably attached to the bottom portion; and
   b) a flexible pinch valve tube disposed in fluid tight communication with the fluidized granular material exit port, the pinch valve tube being sandwiched between the top and bottom portions, the pinch valve tube defining a vent hole which is closed when the top portion is attached to the bottom portion, but which is open when the top portion is removed from the bottom portion.

14. The portable fluidized particle abrasion device of claim 13 wherein the pinch valve further comprises a vent conduit for accepting fluid from the vent hole and venting the fluid away from the pinch tube.

15. The portable fluidized particle abrasion device of claim 1 further comprising a foot switch capable of closing the exit orifice of the dispensing chamber with the lead screw and allowing the flow of granular material-free carrier fluid through the flow chamber.

16. The portable fluidized particle abrasion device of claim 1 wherein the device is adapted to alternatively switch between two different carrier fluids entering the fluid flow inlet port.

17. The portable fluidized particle abrasion device of claim 1 wherein the flow facilitator is a bourdon tube.

* * * * *